United States Patent
Edwards

(10) Patent No.: US 6,962,163 B1
(45) Date of Patent: Nov. 8, 2005

(54) DUAL-FLOAT SNAP-ACTION FLUSH VALVE

(75) Inventor: Harry W. Edwards, Barrington, IL (US)

(73) Assignee: George S. Cole & Associates, Incorporated, Pebble Beach, CA (US)

( * ) Notice: Subject to any disclaimer, the term of this patent is extended or adjusted under 35 U.S.C. 154(b) by 0 days.

(21) Appl. No.: 10/940,486

(22) Filed: Sep. 13, 2004

(51) Int. Cl.⁷ .................. F16K 33/00; E03D 1/33; E03D 1/34
(52) U.S. Cl. .................. 137/1; 137/423; 137/426; 137/430; 137/437; 137/451; 251/7; 4/324; 4/378
(58) Field of Search .................. 4/324, 325, 366, 4/378, 415; 137/414, 416, 426, 430, 432, 137/218, 436, 437, 441, 451, 1; 251/4, 5, 251/7

(56) References Cited

U.S. PATENT DOCUMENTS

| | | | |
|---|---|---|---|
| 1,037,679 A | 9/1912 | Snyder | |
| 1,208,274 A * | 12/1916 | Besler | 137/451 |
| 3,107,747 A * | 10/1963 | Parkison | 137/441 |
| 3,508,574 A * | 4/1970 | Skerritt | 137/451 |
| 3,670,751 A * | 6/1972 | Buswell | 137/451 |
| 3,766,571 A | 10/1973 | Elder et al. | |
| 3,790,968 A | 2/1974 | Pfeifer | |
| 3,913,151 A | 10/1975 | Keimig | |
| 3,965,925 A * | 6/1976 | Gooch | 137/451 |
| 3,996,960 A * | 12/1976 | Martinez-Lozano | 137/451 |
| 4,025,968 A | 5/1977 | Davis | |
| 4,086,667 A | 5/1978 | Miklos | |
| 4,100,928 A * | 7/1978 | Schoepe | 137/15.18 |
| 4,225,987 A | 10/1980 | Goldman et al. | |
| 4,411,029 A | 10/1983 | Huang | |
| 4,615,056 A * | 10/1986 | Grant | 4/366 |
| 4,748,699 A | 6/1988 | Stevens | |
| 4,922,556 A * | 5/1990 | Roosa | 4/378 |
| 4,969,218 A | 11/1990 | Comparetti | |
| 5,062,166 A * | 11/1991 | Krenecki | 4/415 |
| 5,103,507 A | 4/1992 | Sprajc et al. | |
| 5,175,894 A | 1/1993 | Chen | |
| 5,216,761 A * | 6/1993 | Isberg | 4/324 |
| 5,303,728 A | 4/1994 | Senatore | |
| 5,402,823 A | 4/1995 | Cole | |
| 5,421,361 A | 6/1995 | Johnson | |
| 5,464,037 A | 11/1995 | Younes | |
| 5,490,536 A | 2/1996 | Cole et al. | |
| 5,573,037 A | 11/1996 | Cole et al. | |
| 5,642,533 A | 7/1997 | Young | |
| 5,761,749 A | 6/1998 | Chuang | |
| 5,896,593 A * | 4/1999 | Mizrahi | 4/378 |
| 5,896,887 A | 4/1999 | Edwards | |
| 6,123,099 A | 9/2000 | Edwards | |
| 6,539,973 B1 | 4/2003 | Edwards | |
| 6,675,398 B1 | 1/2004 | Antnuez | |
| 6,712,090 B1 * | 3/2004 | Brandelli | 137/414 |
| 2002/0104566 A1 | 8/2002 | Howe | |

* cited by examiner

Primary Examiner—Kevin Lee
(74) Attorney, Agent, or Firm—Seyfarth Shaw LLP

(57) ABSTRACT

A liquid level control apparatus for a flush tank includes a valve mechanism communicating with a fill tube and operable between open and closed conditions, two floats, at least one of which is coupled to the valve mechanism for closing it when the at least one float reaches a predetermined height, and structure interconnecting the floats so as to substantially prevent their vertical movement until a predetermined liquid level is reached corresponding to the predetermined height, thereby causing sudden movement of the at least one float to the predetermined height and sudden closing of the valve.

18 Claims, 5 Drawing Sheets

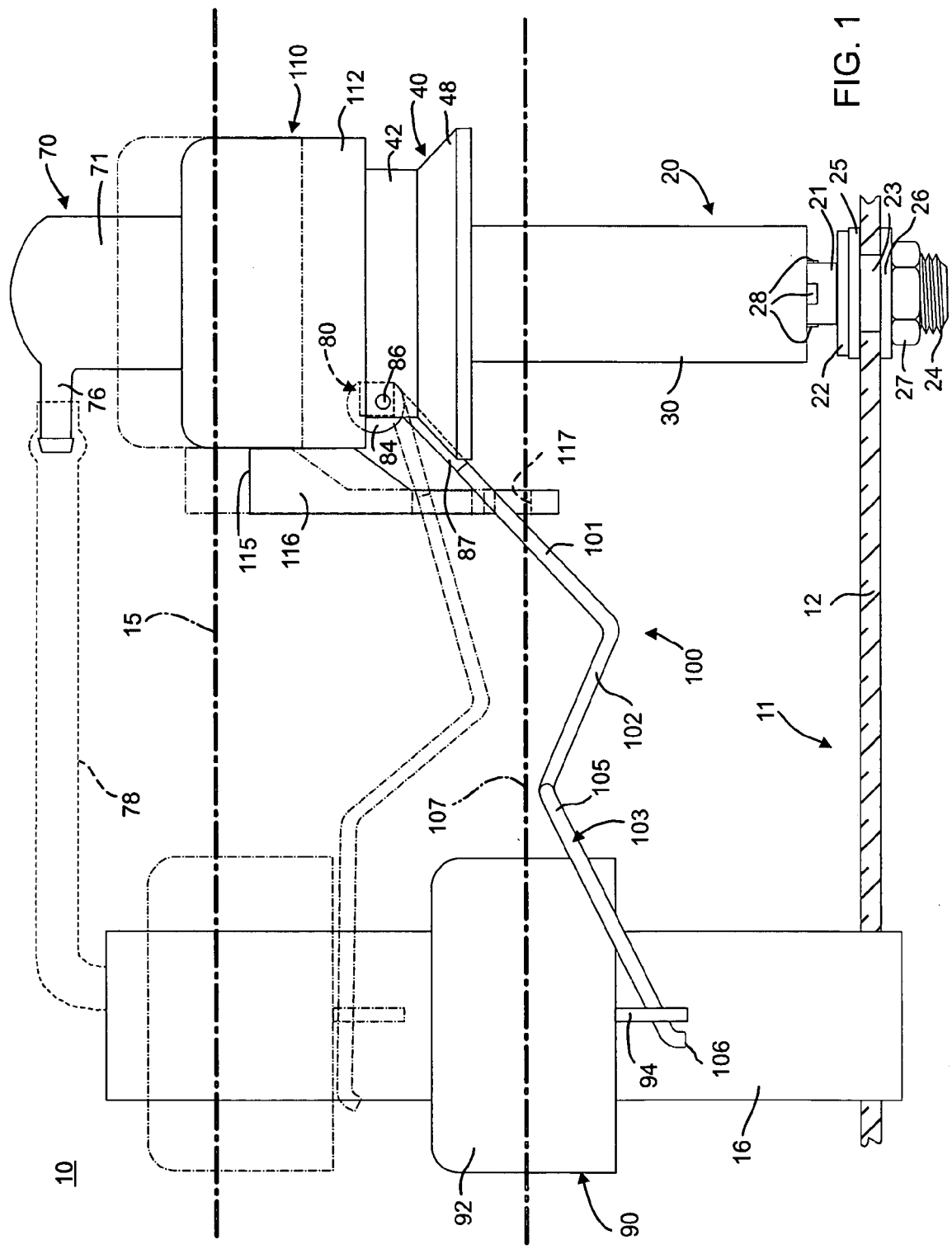

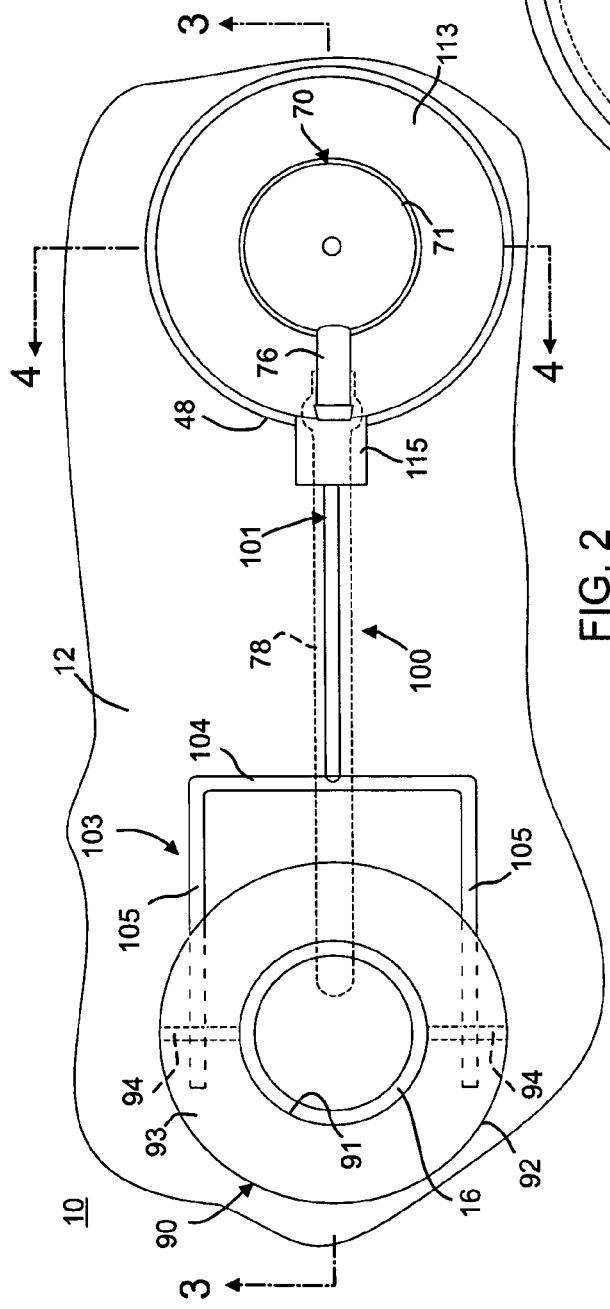
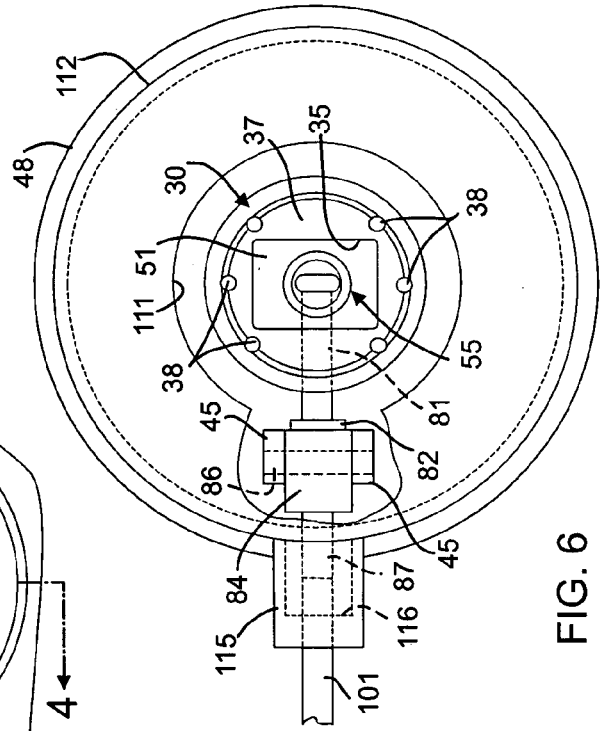
FIG. 6
FIG. 2
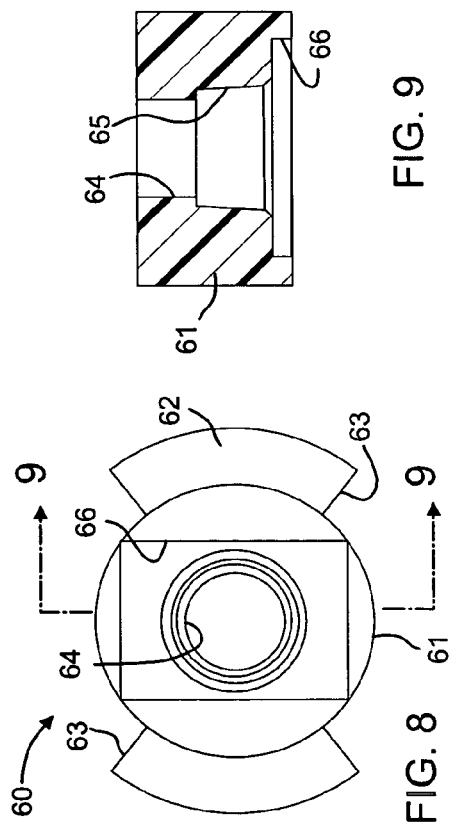
FIG. 9
FIG. 8

DUAL-FLOAT SNAP-ACTION FLUSH VALVE

BACKGROUND

This application relates to apparatus for controlling the liquid level in vessels and, in particular, to such apparatus for use in toilet flush tanks. The apparatus disclosed herein is an improvement of those disclosed in U.S. Pat. Nos. 6,123,099 and 6,539,973.

The aforementioned patents disclose several types of valves utilizing a flexible, resilient pinch tube as a valve member, which is controlled by an actuator engageable with the outside of the tube to pinch it closed. Some of the embodiments disclosed in those patents utilize a float which encircles and moves along an upright fill tube. Upward movement of the float with rising water level is arrested until the water level reaches the desired shutoff level, whereupon the buoyancy force on the float overrides the arresting force so that the float suddenly moves to a shutoff positioned for effecting a snap-action shutoff of the valve.

While these prior arrangements have afforded a satisfactory snap-action shutoff, they require complex floats with plural tube passages therethrough, since the outlet of the pinch valve communicates with the tank through a separate tube externally of the fill tube, which also passes through the float.

SUMMARY

This application discloses a flush valve assembly which avoids the disadvantages of prior valve assemblies while affording additional structural and operating advantages.

In an embodiment, apparatus for controlling the level of liquid in a vessel having a fill tube communicating with the vessel and with a source of liquid, includes a valve mechanism communicating with the fill tube and operable between open and closed conditions relative to the fill tube, two floats in the vessel, at least one of the floats being coupled to the valve mechanism for moving the valve mechanism to its closed condition when the at least one float reaches a predetermined height, and structure interconnecting the floats so as to substantially prevent their vertical movement until a predetermined liquid level is reached corresponding to the predetermined height, thereby causing sudden movement of the at least one float to the predetermined height of the valve mechanism to the closed condition.

In an embodiment, apparatus for suddenly terminating filling of a vessel having a fill tube communicating with the vessel and with a source of liquid when a predetermined liquid level is reached, includes a valve mechanism communicating with the fill tube and operable between open and closed conditions relative to the fill tube, a first float coupled to the valve mechanism for effecting movement of the valve mechanism to its closed condition when the first float reaches a predetermined height in the vessel corresponding to the predetermined liquid level, and arresting mechanism including a second float cooperating with the first float to substantially prevent vertical movement of the first float until the predetermined liquid level is reached.

In an embodiment, the valve mechanism may include valve actuating mechanism having an arm, the second float having an aperture therein through which the arm extends, the arresting mechanism being responsive to initiation of vertical movement of the first float for shifting to an arresting condition wherein the second float is tilted sufficiently to cause the arm to bind in the aperture and prevent vertical movement of the floats, the buoyancy force on the second float when the predetermined liquid level is reached being sufficient to untilt the second float and unbind the arm, thereby to permit the first float to jump to the predetermined height.

There is also disclosed a method of suddenly closing an inlet valve to a vessel when a predetermined liquid level in the vessel is reached, including providing two floats in the vessel, coupling at least one float to the valve for closing the valve when the at least one float reaches a predetermined height in the vessel corresponding to the predetermined liquid level, and interconnecting the floats so as to prevent vertical movement of the at least one float until the predetermined liquid level is reached.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a fragmentary view of a flush tank including an embodiment of liquid level controlling apparatus, shown in side elevation, with parts shown in solid line in their position after draining of the flush tank and in broken line in their position after the tank has been refilled;

FIG. 2 is a slightly reduced top plan view of the apparatus of FIG. 1;

FIG. 6 is an enlarged top plan view of the right-hand side of the apparatus of FIG. 2 with the valve cap and deflector removed;

FIG. 8 is an enlarged bottom plan view of the valve cap of the apparatus of FIG. 3; and FIG. 9 is a sectional view taken along the line 9—9 in FIG. 8.

DETAILED DESCRIPTION

Figure 3:
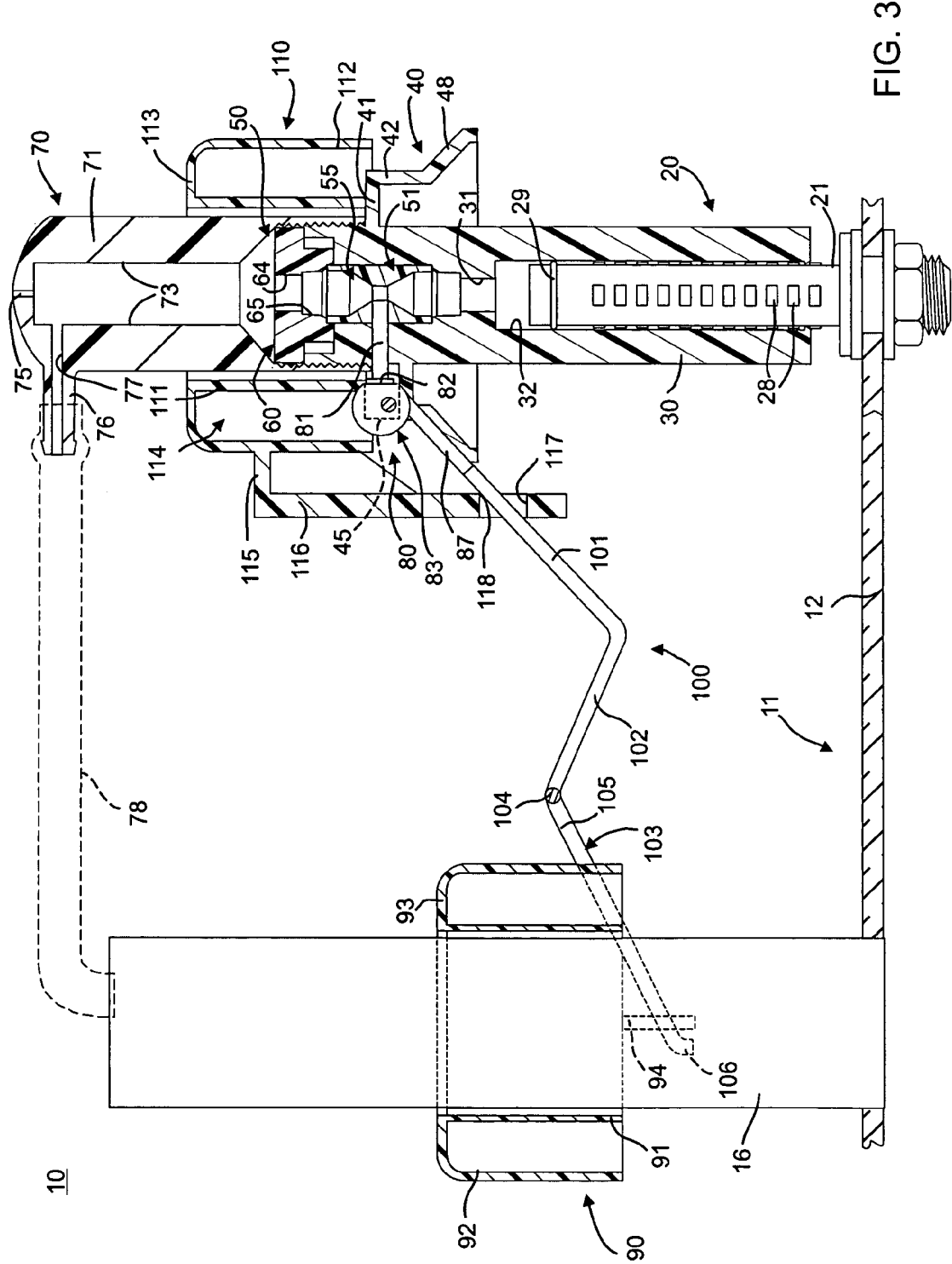
FIG. 3 is a sectional view taken generally along the line 3—3 in FIG. 2.

Referring to FIGS. 1 and 2, there is illustrated a liquid level controlling apparatus in the form of a flush valve assembly, generally designated by the numeral 10, for use in a vessel, such as a toilet flush tank 11, for controlling refilling of the flush tank subsequent to a flushing operation. The tank 11 has a bottom wall 12 and a peripheral side wall (not shown) and contains water which fills the tank 11 to a predetermined full level 15. The flush tank may be provided with an overflow pipe 16, which extends through a complementary opening in the bottom wall 12 and projects upwardly therefrom into the tank and communicates, by a suitable means, with the toilet bowl (not shown), all in a known manner.

Referring also to FIGS. 3–6, the flush valve assembly 10 includes an input conduit in the form of an adjustable-height fill pipe assembly 20, which includes an upstanding fixed pipe 21 having a radially outwardly extending annular flange 22 and a cylindrical collar 23 which depends from the flange 22 and is receivable in a complementary opening in the bottom wall 12. Depending from the collar 23 is an externally threaded stem 24 for coupling to an associated pressurized water source. In use, a gasket 25 is disposed between the annular flange 22 and the upper surface of the bottom wall 12, and the pipe 21 is secured in place by a washer 26 and a nut 27, all in a known manner. The bottom wall aperture for the fill pipe assembly 20 is disposed at a predetermined distance from the aperture for the overflow pipe 16, which distance is standard in almost all flush tanks currently sold in the United States.

Projecting radially outwardly from the outer surface of the pipe 21 at equiangularly spaced-apart locations thereon are four rows of vertically-spaced adjustment lugs 28. A circumferential groove is formed in the outer surface of the pipe 21 adjacent to its upper end for receiving an O-ring seal 29 (FIG. 3). The upper end of the fixed pipe 21 is telescopically received in the lower end of an adjustable pipe 30. More specifically, the pipe 30 has a central cylindrical bore 31 provided with an enlarged-diameter cylindrical counterbore 32 at its lower end, in which the fixed pipe 21 is received. The adjustable pipe 30 is provided at its lower end with four equiangularly spaced and radially inwardly projecting lugs 33. The central bore 31 is provided at the upper end of the pipe 30 with a frustoconical counterbore 34, which communicates with a recess 35 which is rectangular in transverse cross section. The upper end of the pipe 30 has a large-diameter cylindrical counterbore 36, which defines an annular seat surface 37 at the upper end of the rectangular recess 35. Extending longitudinally through the pipe 30 parallel to the longitudinal axis thereof are six circumferentially spaced cylindrical channels 38. The upper end of the adjustable pipe 30 is externally threaded, as at 39.

The adjustable pipe 30 is provided with a skirt or a collar 40, which includes an annular flange 41 projecting radially outwardly from the pipe 30 just below the external threads 39, and is integral at its outer edge with a depending cylindrical flange 42. As can best be seen in FIGS. 3, 5 and 6, the flanges 41 and 42 have a rectangular notch 43 formed therein, closed by a bottom or base wall 44 which is parallel to the annular flange 41. The skirt also includes a pair of upstanding rectangular lugs 45 on opposite sides of the base wall 44 having aligned pivot holes therethrough. Extending into the adjustable pipe 30 just about the base wall 44 is a radial aperture 47, which communicates with the recess 35 (see FIG. 5). Depending from the cylindrical flange 42 and from the base wall 44 is a frustoconical flange 48.

In assembly of the fill pipe assembly 20, the fixed pipe 21 is fitted up inside the counterbore 32 of the adjustable pipe 30. In this regard, the adjustable pipe 30 is rotationally oriented so that its lugs 33 are aligned between the rows of lugs 28 on the fixed pipe 21. Then the adjustable pipe 30 is lowered to the desired height and rotated ¼turn to bring the lugs 33 into alignment with the rows of lugs 28 for resting on the selected ring of lugs 38. It will be appreciated that the O-ring 29 provides a fluid-tight seal between the pipes 21 and 30.

The flush valve assembly 10 includes a valve mechanism 50 (FIG. 3), which includes a valve housing insert 51, a valve member 55, a cap 60 and a deflector 70. The valve housing insert 51 is a rectangular block dimensioned to fit in the rectangular recess 35 in the adjustable pipe 30 and has an axial, somewhat dumbbell-shaped channel 52 extending therethrough for communication with the counterbore 34 and the bore 31 in the adjustable pipe 30. Also formed in the valve housing insert 51 is a side slot 53 (FIGS. 4 and 5), which communicates with the center of the axial channel 52 and, in use, is positioned for alignment and communication with the radial aperture 47 in the adjustable pipe 30.

The valve member 55 is shaped complementary to and is mateably received in the axial channel 52 of the valve housing insert 51. The valve member 55 is formed of a flexible and resilient material, such as a suitable rubber or elastomer, and is supported by the valve housing insert 51, which may be formed of a suitable rigid plastic material. The valve member 55 has a central cylindrical neck 56 joining frustoconical portions 57, which in turn respectively communicate with cylindrical portions 58, all of which portions are snuggly disposed in complementary-shaped portions of the valve housing insert 51. The cylindrical portions 58 respectively communicate with frustoconical portions 59, the lower one of which is snuggly received in the frustoconical counterbore 34 in the adjustable pipe 30.

Referring also to FIGS. 8 and 9, the cap 60 has a cylindrical stem 61 integral at its upper end with an enlarged-diameter head 62 which has diametrically-opposed arcuate cutouts 63 therein. A cylindrical bore 64 extends axially through the cap 60 and is provided at the stem end with a frustoconical counterbore 65. Formed in the distal end face of the stem 61 is a rectangular recess 66.

Figures 5, 7:
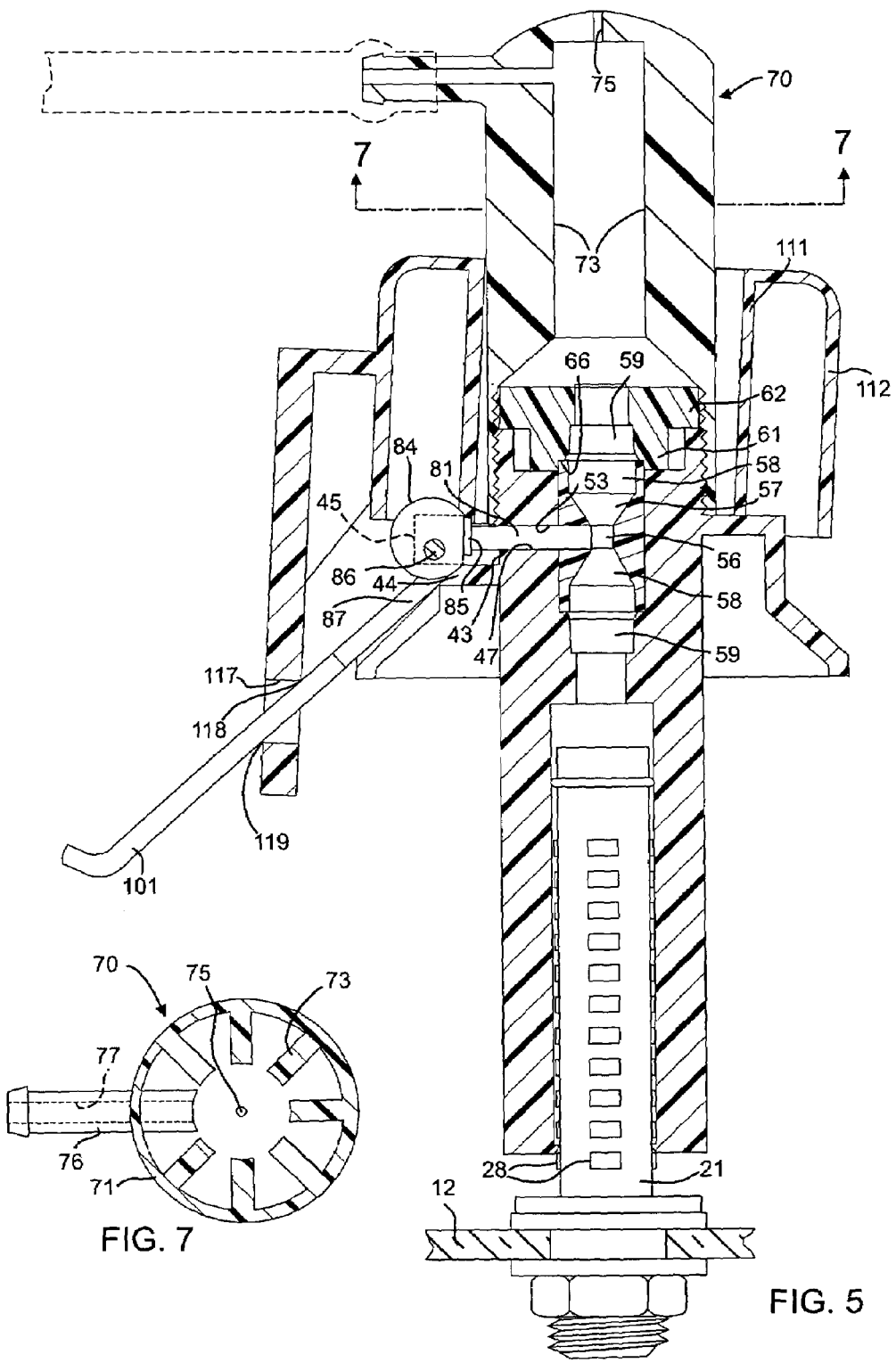
FIG. 5 is a further enlarged fragmentary view similar to the right-hand side of FIG. 3, illustrating the float in its arrested position.
FIG. 7 is a sectional view taken along the line 7—7 in FIG. 5.

In assembly, the cap 60 is fitted in the upper end of the adjustable pipe 30, with the stem 61 seated on the seat surface 37 and the head 62 resting on the upper end of the adjustable pipe 30 (see FIGS. 3 and 5). The cap 60 is rotationally oriented so that the cutouts 63 are respectively aligned with the groups of the longitudinal channels 38 in the adjustable pipe 30 (see FIG. 4). In order to ensure this orientation, the rectangular recess 66 is shaped and dimensioned to mateably receive the upper end of the valve housing insert 51, with the upper frustoconical portion 59 of the valve member 55 snugly seated in the frustoconical counterbore 65 of the cap 60.

The deflector 70 has an elongated cylindrical body 71, the lower end of which is internally threaded, as at 72, and the upper end of which is closed by a dome-shaped end wall. Referring also to FIG. 7, equiangularly spaced-apart vanes 73 project radially inwardly from the cylindrical body 71, each vane having a tapered or angled bottom edge 74. An axial hole 75 is formed in the end wall. A cylindrical nipple 76 projects radially outwardly from the cylindrical body 71 adjacent to the end wall and defines a radial passage 77, which communicates with the interior of the deflector 70 and is adapted to be coupled by a suitable flexible tube 78 to the upper end of the overflow pipe 16, as can best be seen in FIGS. 1–3.

In assembly, the lower end of the deflector 70 is threadedly engaged with the upper end of the adjustable pipe 30 until the tapered bottom edges 74 of the vanes 73 engage the head 62 of the cap 60, thereby holding the cap 60 in place which, in turn, holds the valve housing insert 51 and the valve member 55 in place.

The valve mechanism 50 also includes a valve actuating mechanism 80, including an elongated push rod 81 which extends through the radial aperture 47 in the adjustable pipe 30 and through the side slot 53 in the valve housing insert 51 for engagement with the neck 56 of the valve member 55. The push rod 81 has an enlarged head 82 at the outer end thereof. The valve actuating mechanism 80 also includes a cam member 83, having a circular plate 84 with a flat rear side 85 and disposed for pivotal movement about the axis of a pivot pin 86, which extends through an eccentric opening in the plate 84 and is journaled in complementary bearing holes in the lugs 45. The flat side 85 of the circular plate 84 is disposed for engagement with the head 82 of the push rod 81 (see FIG. 5). Integral with the circular plate 84 and extending downwardly and laterally outwardly therefrom is an extension arm 87.

The valve actuating mechanism 80 also includes a generally cylindrical float 90 which is disposed coaxially about the overflow pipe 16 for axial movement therealong. The float 90 has an inner cylindrical wall 91 and an outer cylindrical wall 92 joined by an annular top wall 93. Depending from the walls 91 and 92 at diametrically opposed locations are tabs, 94, respectively provided with holes 95 formed therethrough (see FIG. 4). The float 90 is coupled to the cam member 83 by a connecting rod 100, which may be somewhat Z-shaped, having an upper portion 101 connected to the extension arm 87, an intermediate portion 102 and a lower clevis portion 103 (FIG. 2), which has a bight 104 and a pair of depending legs 105 which, respectively, extend through the holes 95 in the tabs 94 and terminate at downturned tips 106.

In operation, it will be appreciated that, when the tank 11 is refilling after a flush, when the water in the tank reaches a predetermined level 107, it will exert a buoyancy force on the float 90 which will cause it to begin to rise vertically along the overflow pipe 16. This movement will tend to pivot the connecting rod 101 and the cam member 83 in a clockwise direction, as viewed in FIG. 1, which will tend to move the valve mechanism 50 to a closed position, as will be explained more fully below.

Figure 4:
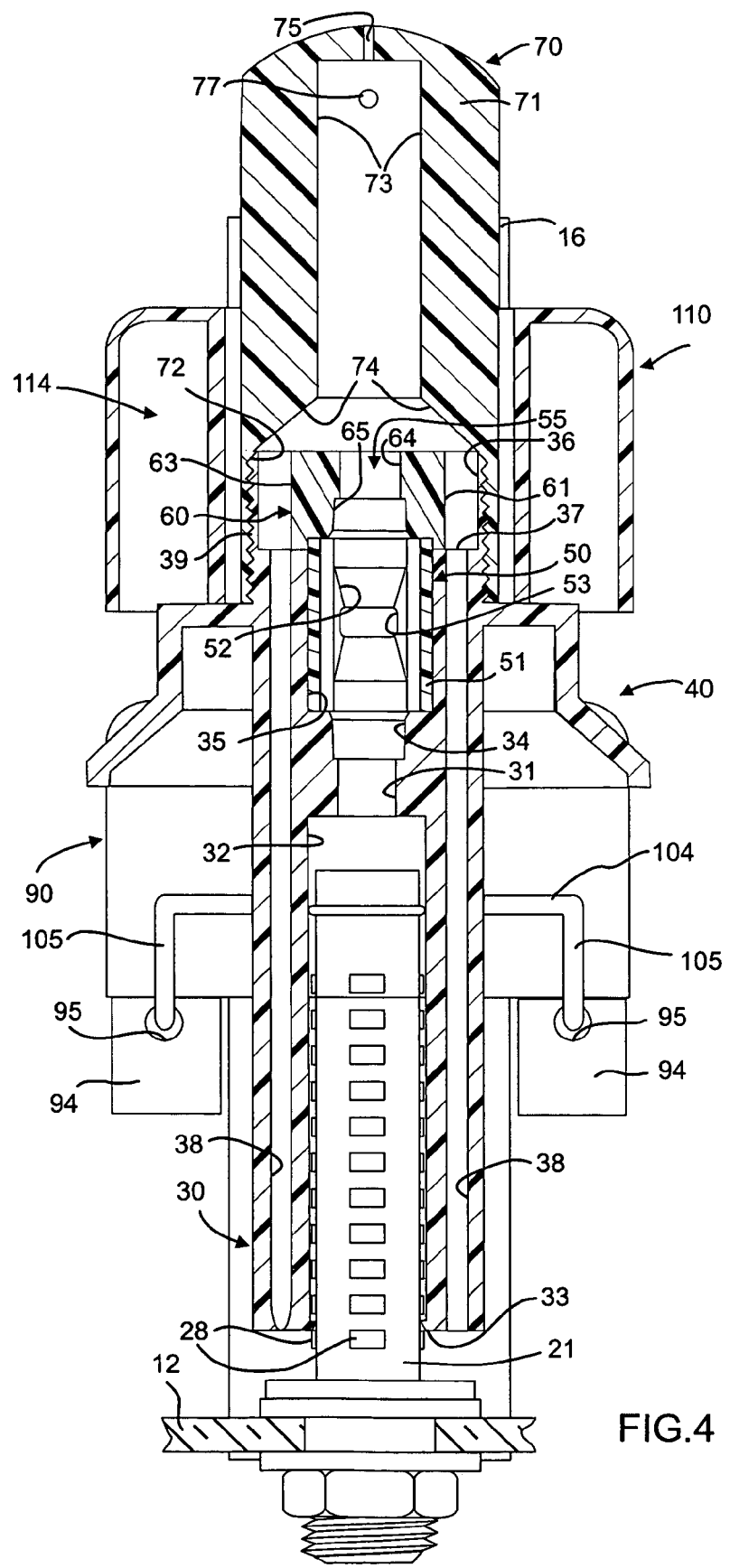
FIG. 4 is an enlarged sectional view taken generally along the line 4—4 in FIG. 2.

It is a significant aspect of the flush valve assembly 10 that, as the water level starts to move above the level 107, the movement of the valve mechanism 50 toward its closed position is arrested until the water reaches the full level 15 (FIG. 1). In this regard, there is provided an arresting float 110, which is disposed about the upper end of the fill pipe assembly 20 and the deflector 70 for movement axially therealong. The float 110 includes an inner cylindrical wall 111 and an outer cylindrical wall 112 joined by an annular top wall 113 for cooperation to define an open-bottom annular chamber 114 (FIGS. 3–5). Extending laterally outwardly from the outer cylindrical wall 112 is a radial projection 115, which is integral at its outer end with a depending arm 116 which extends downwardly well below the lower ends of the cylindrical walls 111 and 112 and is provided adjacent to its lower end with a rectangular slot 117 formed therethrough.

In assembly, the float 110 is fitted down over the upper end of the fill pipe assembly 20 before installation of the deflector 70, so that the float rests upon the annular flange 41 of the adjustable pipe 30, as can be seen in FIGS. 1 and 3. The upper portion 101 of the connecting rod 100 is then fitted through the slot 117 and assembled with the extension arm 87 of the cam member 83.

In operation, after a flush the flush tank 11 empties, in a known manner, and the floats 90 and 110 and the connecting rod 100 drop to the position illustrated in FIGS. 1, 3 and 4. In this regard, the downward or counterclockwise pivotal movement of the cam member 83 is limited by engagement with the skirt 40. This also limits the downward movement of the connecting rod 100 and the float 90. The parts may be dimensioned and arranged so that, in this post-flush condition, the upper edge of the slot 117 stops against the connecting rod 100 at a contact point 118 (see FIG. 3), at which position there may be a slight clearance between the lower end of the slot 117 and the connecting rod 100.

In this post-flush condition, the valve mechanism 50 is in an open condition and water flows freely from the associated source, upwardly through the fixed pipe 21, the bore 31 in the adjustable pipe 30, the valve member 55 and the cap 60 into the deflector 70. The deflector vanes 73 serve to break up the water flow and distribute the force exerted on the deflector 70. A majority of the water entering the deflector 70 drops back down through the cutouts 63 in the cap 60 and then downwardly through the channels 38 in the adjustable pipe 30 into the tank 11 for refilling the tank. A smaller portion of the water entering the deflector 70 exits through the nipple 76 and the bowl fill tube 78 into the overflow pipe 16, and then back down into the toilet bowl for refilling the bowl.

When the water in the tank 11 reaches the level 107 (FIG. 1), the buoyancy force on the float 110 tends to lift it, thereby tending to pivot the connecting rod 100 in a clockwise direction, as viewed in FIG. 1, which tends to put upward pressure on the depending arm 116 of the arresting float 110. Because of the eccentric location of the slot 117 relative to the central axis of the float 110, this upward pressure tends to tilt the float 110 in a clockwise direction, as can best be seen in FIG. 5, causing the lower end of the slot 117 to contact the upper portion 101 of the connecting rod 100 at contact point 119. Thus, in this tilted position, the connecting rod 100 engages both the top and the bottom of the slot 117 at the contact points 118, 119, creating a binding which arrests upward movement of the connecting rod 100 and the float 110 thereby, in turn, arresting upward movement of the float 90. The tilted position of the parts is shown exaggerated in FIG. 5 for purposes of illustration. In actual practice, this tilting movement may be extremely small, so as to be barely noticeable to the naked eye.

When the water level in the tank 11 reaches the full level 15, the buoyancy force exerted on the float 110 will cause it to level itself, breaking the bind between the connecting rod 100 and the slot 117, thereby permitting the floats 90 and 110 to rise. The floats 90 and 110 will thereupon suddenly jump to the dotted-line positions illustrated in FIG. 1, thereby pulling the connecting rod 100 up and pivoting the cam member 83 in the clockwise direction, as viewed in FIGS. 1, 3 and 5. This pivotal movement about the axis of the pivot pin 86 will cause the upper edge of the flat side 85 of the circular plate 84 to move downwardly to the right against the head 82 of the push rod 81, driving the push rod 81 to the right for pinching closed the neck 56 of the valve member 55, shutting off the flow of water through the valve member 55, in a known manner. This movement of the parts from the solid-line to the broken-line position in FIG. 1 will occur almost instantaneously, causing a snap-action shutoff of the valve mechanism 50.

An umbrella valve (not shown) may be installed in the upper end of the deflector 70 for normally closing the axial hole 75. In the event that a low pressure should develop upstream of the valve member 55 while the valve is open, this low pressure will open the umbrella valve, exposing the interior of the deflector 70 to ambient air pressure through the axial hole 75, and preventing siphoning of water from the tank 11 back through the channels 38 in the adjustable pipe 30.

In a constructional model of the flush valve assembly 10, the parts may all be formed of suitable plastic or elastomeric materials. However, the connecting rod 100 and the cam member 83 could be formed of an easily machineable metal, such as brass, to ensure adequate stiffness. It can be seen that the fill pipe assembly 20 and deflector 70 and the overflow pipe 16 serve as guides for the vertical movement of the floats 90 and 110. While substantially cylindrical floats are illustrated, it will be appreciated that other shapes could be utilized and, while floats with open-bottom chambers are illustrated, other types of floats, such as those with closed buoyancy chambers, could also be used.

From the foregoing, it can be seen that there has been provided an improved flush valve assembly which is of relatively simple and economical construction, accomplishes snap-action shutoff of the flush valve and is usable, without modification, in almost all flush tank arrangements currently sold in the United States.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicant's contribution. The actual scope of the protection sought is intended to be defined in the following claims, when viewed in their proper perspective based on the prior art.

What is claimed is:

1. Apparatus for controlling the level of liquid in a vessel having a fill tube communicating with the vessel and with a source of liquid, the apparatus comprising:
   a valve mechanism including a flexible and resilient pinch tube and communicating with the fill tube and operable between open and closed conditions relative to the fill tube,
   two floats in the vessel, at least one of the floats being coupled to the valve mechanism for moving the valve mechanism to its closed condition when the at least one float reaches a predetermined height, and
   structure interconnecting the floats so as to substantially prevent their vertical movement until a predetermined liquid level is reached corresponding to the predetermined height, thereby causing sudden movement of the at least one float to the predetermined height and of the valve mechanism to the closed condition.

2. The apparatus of claim 1, wherein the valve mechanism includes a cam assembly engageable with the pinch tube for pinching it shut in the closed condition of the valve mechanism.

3. The apparatus of claim 1, wherein the structure interconnecting the floats includes an aperture formed in one of the floats and an arm extending through the aperture and interconnecting the valve mechanism and the other float.

4. The apparatus of claim 1, and further comprising guide structure for guiding movement of the floats.

5. The apparatus of claim 4, wherein the guide structure includes the fill tube and an overflow tube in the vessel.

6. The apparatus of claim 5, and further comprising adjustment structure for adjusting the height of the fill tube.

7. Apparatus for suddenly terminating filling of a vessel having a fill tube communicating with the vessel and with a source of liquid when a predetermined liquid level is reached, the apparatus comprising:
   a valve mechanism including a flexible and resilient pinch tube and communicating with the fill tube and operable between open and closed conditions relative to the fill tube,
   a first float coupled to the valve mechanism for effecting movement of the valve mechanism to its closed condition when the first float reaches a predetermined height in the vessel corresponding to the predetermined liquid level, and
   arresting mechanism including a second float cooperating with the first float to substantially prevent vertical movement of the first float until the predetermined liquid level is reached.

8. The apparatus of claim 7, wherein the first float is annular in shape.

9. The apparatus of claim 8, and further comprising an overflow tube disposed in the vessel, the first float encircling the overflow tube for movement longitudinally therealong.

10. The apparatus of claim 7, wherein the second float is annular in shape.

11. The apparatus of claim 10, wherein the second float encircles the fill tube for movement longitudinally thereaalong.

12. Apparatus for suddenly terminating filling of a vessel having a fill tube communicating with the vessel and with a source of liquid when a predetermined liquid level is reached, the apparatus comprising:
   a valve mechanism communicating with the fill tube and operable between open and closed conditions relative to the fill tube,
   the valve mechanism including valve actuating mechanism having an arm; and
   a first float coupled to the arm for effecting movement of the valve mechanism to its closed condition when the first float reaches a predetermined height in the vessel corresponding to the predetermined liquid level, and
   arresting mechanism including a second float having an aperture therein through which the arm extends,
   the arresting mechanism being responsive to initiation of vertical movement of the first float for shifting to an arresting condition wherein the second float is tilted sufficiently to cause the arm to bind in the aperture and prevent vertical movement of the floats,
   the buoyancy force on the second float when the predetermined liquid level is reached being sufficient to untilt the second float and unbind the arm, thereby to permit the first float to jump to the predetermined height.

13. The apparatus of claim 12, wherein the valve mechanism includes a flexible and resilient pinch tube.

14. The apparatus of claim 13, wherein the valve actuating mechanism includes a cam assembly engageable with the pinch tube for pinching it shut in the closed condition of the valve mechanism.

15. The apparatus of claim 12, wherein the second float is annular in shape.

16. The apparatus of claim 15, wherein the second float includes a depending portion having the aperture formed therein.

17. The apparatus of claim 12, wherein in the arresting condition the arm binds against upper and lower edges of the aperture.

18. A method of suddenly closing an inlet valve to a vessel when a predetermined liquid level in the vessel is reached, the method comprising:
   providing two floats in the vessel,
   coupling at least one float to the valve for closing the valve when the at least one float reaches a predetermined height in the vessel corresponding to the predetermined liquid level,
   interconnecting the floats so as to prevent vertical movement of the at least one float until the predetermined liquid level is reached;
   causing one of the floats to jam against interconnecting structure until the predetermined liquid level is reached which includes tilting one of the floats so as to create a jam condition between an actuator arm and an aperture through which it extends; and
   providing the inlet valve in the form of a flexible and resilient pinch tube and causing the tube to be pinched shut when the predetermined liquid level is reached.

* * * * *